United States Patent
Tamir et al.

(10) Patent No.: US 10,412,372 B2
(45) Date of Patent: Sep. 10, 2019

(54) DYNAMIC BASELINE DEPTH IMAGING USING MULTIPLE DRONES

(71) Applicant: Intel IP Corporation, Santa Clara, CA (US)

(72) Inventors: Eliezer Tamir, Bait Shemesh (IL); Anders Grunnet-Jepsen, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 62 days.

(21) Appl. No.: 15/856,957

(22) Filed: Dec. 28, 2017

(65) Prior Publication Data

US 2019/0052865 A1 Feb. 14, 2019

(51) Int. Cl.
*H04N 13/271* (2018.01)
*B64C 39/02* (2006.01)
*B64D 47/08* (2006.01)

(52) U.S. Cl.
CPC ......... *H04N 13/271* (2018.05); *B64C 39/024* (2013.01); *B64D 47/08* (2013.01); *B64C 2201/123* (2013.01); *B64C 2201/127* (2013.01); *B64C 2201/143* (2013.01)

(58) Field of Classification Search
CPC ............ B64C 39/024; B64C 2201/143; B64C 2201/123; B64C 2201/127; H04N 13/271; B64D 47/08
See application file for complete search history.

(56) References Cited

U.S. PATENT DOCUMENTS

| | | | |
|---|---|---|---|
| 10,182,225 B1* | 1/2019 | Cui | G06T 7/002 |
| 2017/0374351 A1* | 12/2017 | Doerre | B64C 39/024 |
| 2018/0032074 A1* | 2/2018 | Clynne | G06T 7/70 |
| 2018/0093781 A1* | 4/2018 | Mallinson | B64F 1/04 |
| 2018/0295335 A1* | 10/2018 | Burgess | G01S 19/31 |

* cited by examiner

*Primary Examiner* — Neil R Mikeska
(74) *Attorney, Agent, or Firm* — Schwegman Lundberg & Woessner, P.A.

(57) ABSTRACT

Systems and methods may include a drone or multiple drones to capturing depth information, which may be used to create a stereoscopic map. The drone may capture information about two trailing drones, including a baseline distance between the two trailing drones. Additional information may be captured, such as camera angle information for one or both of the two trailing drones. The drone may receive images from the two trailing drones. The images may be used (on the drone or on another device, such as a base station) to create a stereoscopic image using the baseline distance. The stereoscopic image may include determined depth information for objects within the stereoscopic image, for example based on the baseline distance between the two trailing drones and the camera angle information.

25 Claims, 6 Drawing Sheets

DYNAMIC BASELINE DEPTH IMAGING USING MULTIPLE DRONES

BACKGROUND

An unmanned aerial vehicle (UAV), commonly known as a drone, is an aircraft without a human pilot aboard. The size of drones may range from small hobby scale suitable for close range operation proximate to a user to large scale systems capable of hauling large payloads over many miles. Drones used for depth mapping are typically very large and commercial grade. Smaller drones may not produce sufficiently detailed images that are typically required for mapping.

Current drone based solutions put two cameras on a single drone in a rigid stiffener to ensure that the relative positions of the two cameras do not change after initial calibration. However, the size of the rigid stiffener is often limited to the size of the drone (with larger drones being more expensive). These current stereo solutions either need a very large (and thus expensive) drone or must compromise on accuracy.

Other efforts at depth mapping rely on Light Detection and Ranging (LIDAR), which operates using time-of-flight, but requires high powered, bulky, and expensive drones that have very poor spatial resolution (x-y) and orders of magnitude less dense point clouds than the dual camera solution. In other systems, Structure-from-Motion (SfM) uses a single color camera and take pictures at multiple times at different locations to create synthetic longer baselines (virtual stereo pairs), but are very dependent on accurate visual (and inertial) odometry to track the drone's own location. These systems also require that the scene being imaged does not change. SfM also requires capturing data and post-processing it, which is not conducive to real-time imaging.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for capturing depth information are described herein. The systems and methods described herein use a drone system, including three or more drones, to accurately image, map, and capture depth information. The drones in the drone system may be lightweight, small, or inexpensive, and still produce accurate depth information by using the techniques described herein.

The systems and methods described herein use three drones, with a lead drone actively measuring the distance and relative position of the other two drones (e.g., of the cameras on the other two drones), such that the distance between the two drones, the relative angles of the cameras on the two drones, etc., may be computed, which allows for a large distance (also called a baseline) between the two drones. The baseline affects the accuracy of depth information captured by the two drones, with a larger baseline corresponding to an increase in accuracy. In other words, the length of the baseline is a limiting factor for the accuracy of the depth calculation (all else being equal) so the bigger the baseline the greater the accuracy.

The accuracy of long distance stereo depth imaging is typically limited by sensor resolution, field-of-view (FOV) overlap of dual cameras, and a baseline distance between the cameras. For a given camera technology, the greater the distance between the cameras the better the accuracy. The systems and methods described herein allow for an increase (e.g., dynamically) in the baseline while retaining good calibrated stereo depth imaging. For example, for aerial reconnaissance with drones, depth ranging at greater than 500 m may be performed with errors of a few cm or less.

The systems and methods described herein use multiple drones (in the simplest case three, although more may be used), to accurately measure the relative position (e.g., distance and orientation) between the drones in real-time. A lead drone may be used to capture extrinsic information about other drones of the multiple drones which is used for accurate depth calculations (e.g., position of a camera center or a camera angle). The extrinsic information may include a distance between the other drones of the multiple drones (or distance to the lead drone) and camera pointing angle. In an example, the drones of the system may fly in a triangle configuration (in the three drone case, for example). A drone of the system may carry an active or a passive optical marker, such as a calibration chart or an LED, to facilitate dynamic calibration. In an example, a camera on a drone may be a depth camera. Calculations to generate depth information may be done in real-time, such as to dynamically correct the stereo depth calibration constant and may be used to calculate depth accurately.

Figure 1A:
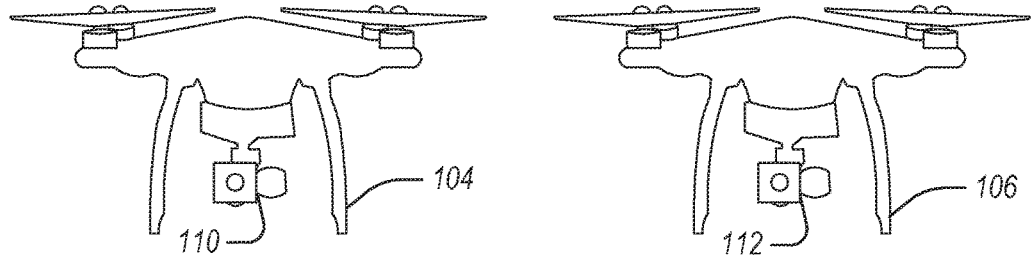
FIGS. 1A-1B illustrate a drone system for capturing depth information in accordance with some embodiments.
Figure 1A:
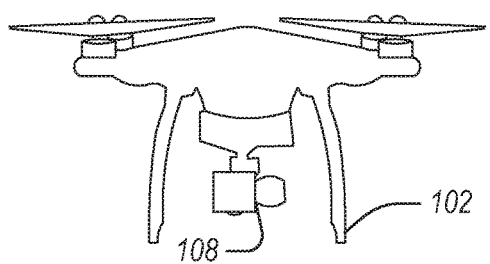
Figure 1B:
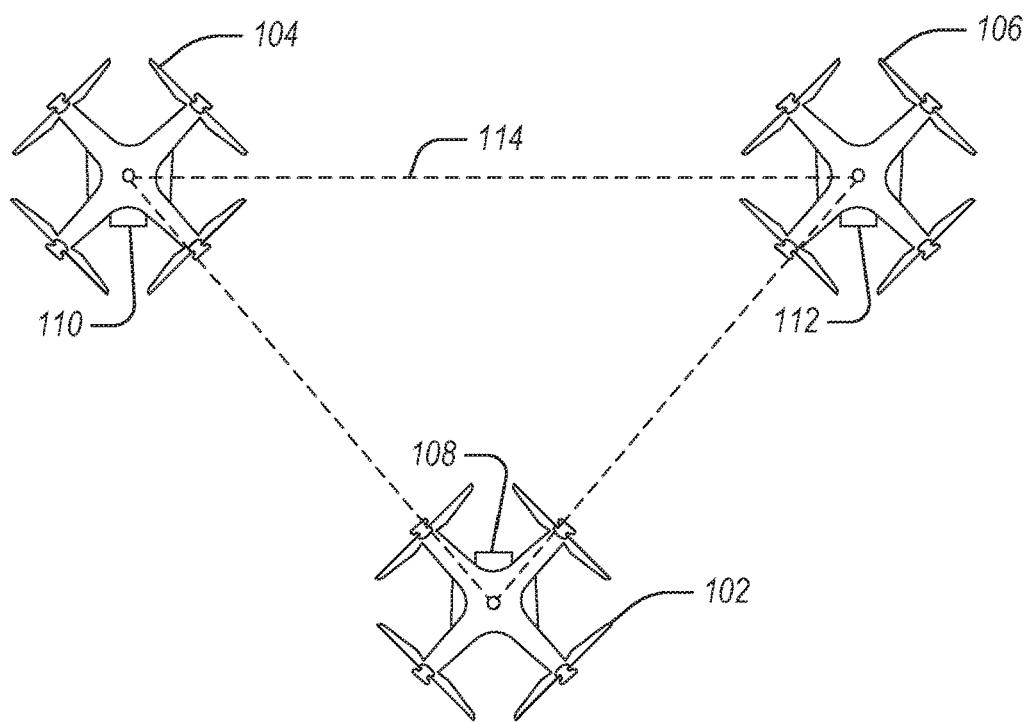

FIGS. 1A-1B illustrate a drone system illustrated in two views 100A-100B for capturing depth information in accordance with some embodiments. The first view 100A illustrates a side view of the drone system, which may be offset at an angle. The second view 100B illustrates a top-down view of the drone system. In the example shown in views 100A-100B, three drones are illustrated for simplicity. Again, more than three drones may be used. Additionally, other configurations than the ones shown in views 100A-100B may be used, such as a square or diamond configuration with four drones, different orientations of the cameras within the system, three or more drones in a line with a lead drone ahead, behind, above, below, etc., or the like. The distances, relative or absolute depicted in FIGS. 1A-1B may not be to scale.

In an example, one or more of the cameras 108, 110, or 112 may be a depth camera. In another example, one or more of the cameras 108, 110, or 112 may be a high-resolution camera. The two drones 104 and 106 may be monitored by the third drone 102, sometimes referred to herein as a lead drone. The lead drone 102 tracks drones 104 and 106 to determine the baseline (separation or distance) between the two drones 104 and 106. The drones 104 and 106 may be used to capture a scene of interest. In an example, one of or both of drones 104 or 106 may track or image the lead drone 102. Using information captured by the lead drone 102 (including optionally, information captured by the drone 104 or the drone 106), the drone system may determine angles of cameras of drones 104 or 106, or the separation between the cameras of drones 104 and 106. These calculations may be performed in real time.

For example, the lead drone 102 may include a camera 108. The second drone 104 may include a camera 110, and the third drone 106 may include a camera 112. As shown in view 100B, the camera 110 or the camera 112 may be facing in a direction generally opposite a direction that the camera 108 is facing. When the camera 108 captures an image, both of the cameras 110 and 112 may be in the image. Using this image, the distance 114 between the two drones 106 and 104 or the two cameras 110 and 112 may be determined. In an example, the camera 110 or the camera 112 may capture an image, which may include information about the lead drone 102, such as a position of the camera 108. In an example, three images may be captured, one each by cameras 108, 110, and 112, at the same or substantially (e.g., within 1 ms to 17 ms or less than a time between frames at 60 frames per second) the same time. The timing for substantially the same time may be adjusted or configured by a user. Using these three images, the distance 114 at that particular time may be determined (using the image from camera 108), allowing depth information to be determined from the images taken by the cameras 110 and 112. For example, the drones 102, 104, and 106 may include an infrared (IR) light-emitting diode (LED), (e.g., a high-power IR LED) which may be time gated, such as via a shared radio link. The IR LEDs may be used to calculate a location of each of the LEDs, such as with 1/100 pixel accuracy. Using the IR LEDs as reference points in each of the three images, precise depth information may be determined.

In an example, information from one or more of the cameras 108, 110, or 112, may be transmitted (e.g., send images) to the lead drone 102 or to a base-station. The images may be used at the lead drone 102 or the base-station to perform stereo depth calculations, such as in real-time. The depth calculations may be used to create a depth map, a stereoscopic image, or the like.

For stereo triangulation, Equation 1 below may be used for determining a depth Z. The depth Z is related to the focal length of the individual cameras (f), the disparity (d), and the baseline (B). In an example, the disparity is a number of pixels on an image and the baseline is the distance 114. The closer an object is to a camera, the greater the shift in a resulting depth image. The shift (from an image of camera 110 to an image of camera 112) of an object may be called the disparity. In this example, depth error may scale inversely with the baseline distance 114 as shown in Eq. 1 below, and an increase in the distance 114 decreases the error.

$$Z = \frac{fB}{d} \qquad \text{Eq. 1}$$

The smallest resolvable depth step may be determined by a minimum discernable disparity shift, which, in an example, may be as low as 1/20th of a pixel. The depth error may be determined as shown below in Equation 2.

$$\Delta Z = \frac{z^2}{B * f} * \Delta d \qquad \text{Eq. 2}$$

-continued
Where:

$\Delta Z$ is the depth error $z$ is the depth of a point of interest (e.g., an object)

$B$ is the baseline (e.g., distance 114)

$f$ is a focal length $\Delta d$ is the disparity error

Because the baseline b is inversely proportional to the depth error in Eq. 2, increasing the baseline decreases the depth error. In an example, two camera sensors may be placed on the drones 104 and 106 at a distance 114 of 13 cm as a baseline. The two camera sensors may, for example, have a 1 MP disparity with a field of view (FOV) of 50 degrees. Using these numbers, depth information may be determined with an approximately 5 m root mean square (RMS) error at 100 m (the object or scene where the depth information is to be determined is approximately 100 m away from the drones 104 and 106). By flying two drones 1.3 m apart (a 10 times increase over the 13 cm baseline), the error is only 50 cm (for 100 m away objects), and at 13 m apart (a 100 times increase over the 13 cm baseline or a 10 times increase over the 1.3 m baseline) the error is only 5 cm (for 100 m away objects).

In an example, one or more of the drones 102, 104, or 106 may experience vertical instability, which may affect the accuracy of the depth information captured. Independent instability of two or more drones may cause measurement errors. In this example, the lead drone 102, or one or both of the drones 104 or 106, may include a calibration target. The calibration target may be used to individually calibrate each set of images (e.g., frames from two or more of the cameras 108, 110, and 112). For example, using images from all three cameras 108, 110, and 112, and a calibration target on the lead drone 102, images from the cameras 110 and 112 may include identifying information for the calibration target. The distance 114, as well as a relative vertical distance between the drones 104 and 106 may be determined using the calibration target information from images from both the cameras 110 and 112, the image from the camera 108, and frame information tying the three images together, using Eqs. 1 or 2. In an example, the calibration target may include a target with a well-defined pattern such that precision in the pattern may be determined from one of the images. In this example, the pattern may be a well-defined pattern (e.g., specified such that the camera can detect aspects of the pattern) that allows for precision measurements of relative position or angle of the pattern from the camera.

Intrinsic information for each camera (e.g., field of view, disparity, focal length, lens information, measurement of the focal length in both x and y directions, etc.) may be known and extrinsic information such as the distance 114 between drones 104 and 106, an angle between the cameras 110 and 112, which may be measured using the image taken by camera 108, which may be determined using a sensor, such as an accelerometer, gyroscope, magnetoscope, GPS device, etc. With the intrinsic and extrinsic information, the lead drone 102 or a remote device (e.g., a base station) the depth information may be calculated and errors or differences in the images due to angle or distance may be offset.

In an example, images taken by the cameras 108, 110, and 112 may be time synchronized, such as using a radio beacon or a Bluetooth message. By time synchronizing the images from the three cameras 108, 110, and 112, a snapshot of the distance 114 and angles between the drones 104 and 106 may be accurately calculated using the image taken by the camera 108 at a particular time. In an example, a relative distance between the lead drone 102 and one or both of the drones 104 or 106 may be determined for use in compensating for flight instabilities (e.g., altitude differences, camera angle differences, or the like). Additionally, stabilized cameras on the drones 102, 104, or 106 may be used to reduce blurriness or distortion in the images. In an example, the cameras 108, 110, and 112, may have a global shutter to prevent rolling shutter artifacts. An image may also have certain distortions, which may be fixed (e.g., pincushion distortion may be made rectilinear). In another example, rather than frame-by-frame synchronization, a more detailed line-by-line synchronization may be performed. Each line (as scanned by the cameras 110 and 112, for example) may be synchronized, with depth information, the distance 114, and relevant angle calculations determined for each line. In an example, one or more additional cameras may be placed on one or more of the drones 102, 104, or 106. In an example, the drones 102, 104, and 106 may be traveling to the left or the right of the page in FIGS. 1A-1B, such that drone 102, called the lead drone, is actually slightly trailing the drone 104 to the left or drone 106 to the right.

Figure 2:
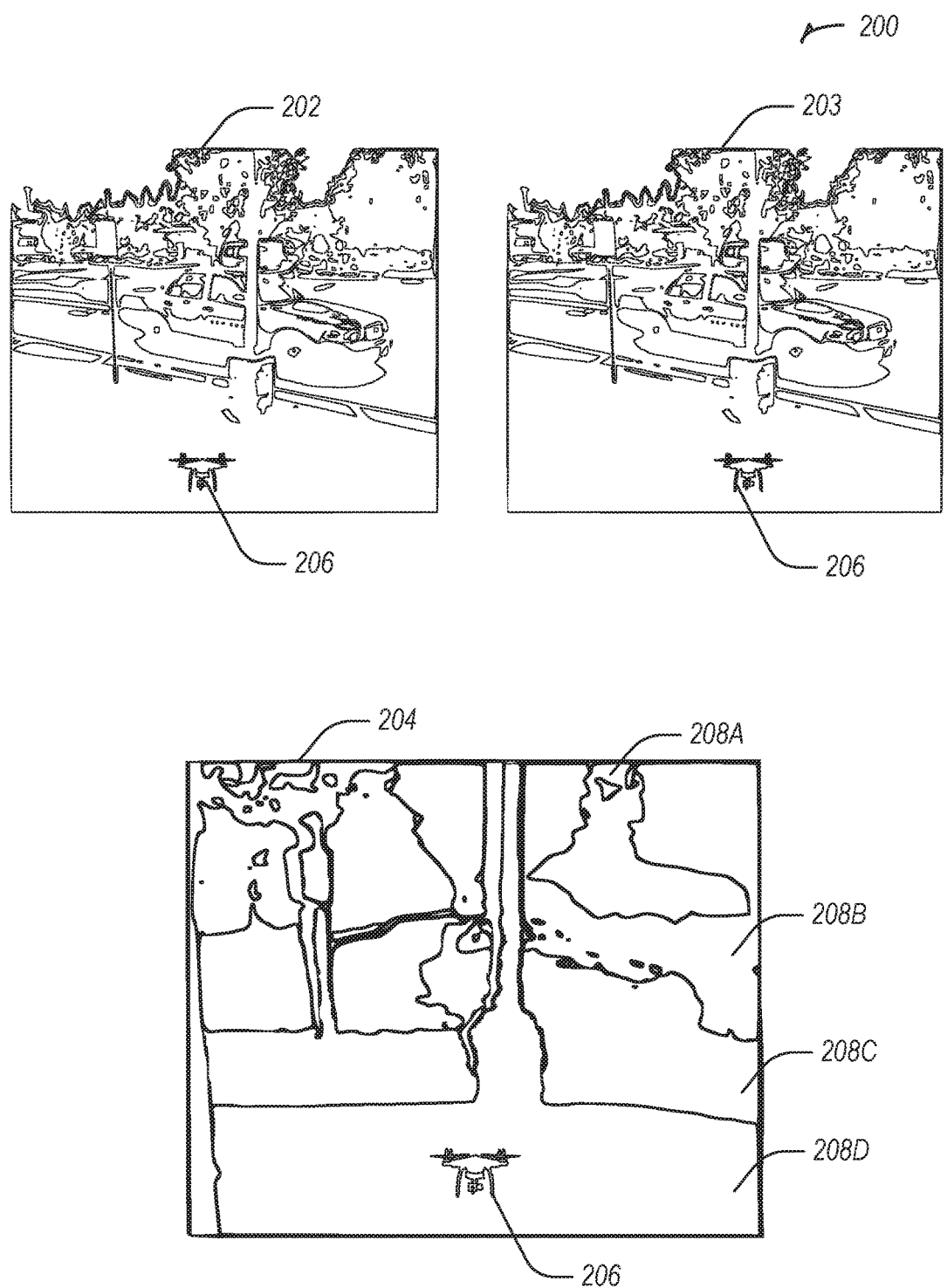
FIG. 2 illustrates an image and a depth map in accordance with some embodiments.

FIG. 2 illustrates two images 202 and 203 and a depth map 204 in accordance with some embodiments. The depth map 204 may correspond to the images 202 and 203 (e.g., identify object depth information for the images 202 and 203). The image 202 may, for example, be an image captured by one of the two drones 104 or 106 of FIG. 1, and the image 203 may be an image captured by the other of the two drones 104 or 106. A lead drone 206 appears in the images 202 and 203 (e.g., lead drone 102 of FIG. 1). The lead drone 206 may be visible in the depth map 204 or may be removed from the depth map 204. For example, a depth of the lead drone 206 may be shown in the depth map 204. In another example, the lead drone 206 may be removed, cropped, or omitted from the depth map 204. The depth of the lead drone 206 may be used to determine depth information for the depth map 204, for example using a small portion of each image where the lead drone 206 is located to calibrate.

The depth map 204 includes various depth ranges 208A-208D, which may appear or include information that is smooth, in tranches or discrete, or the like. Greater detail in the depth information may be determined by increasing a baseline between the two drones captured by the lead drone 206. The images 202 and 203 may be used to determine the depth map 204 based on the baseline between the two drones. Slight differences in the images 202 and 203 where objects appear to shift from left to right in image 202 to image 203 allow for determination of depth of the objects in the images 202 and 203. Depth information may be determined for the lead drone 206, which appears to the left of the light pole in image 202 and aligned with the light pole in image 203.

Figure 3:
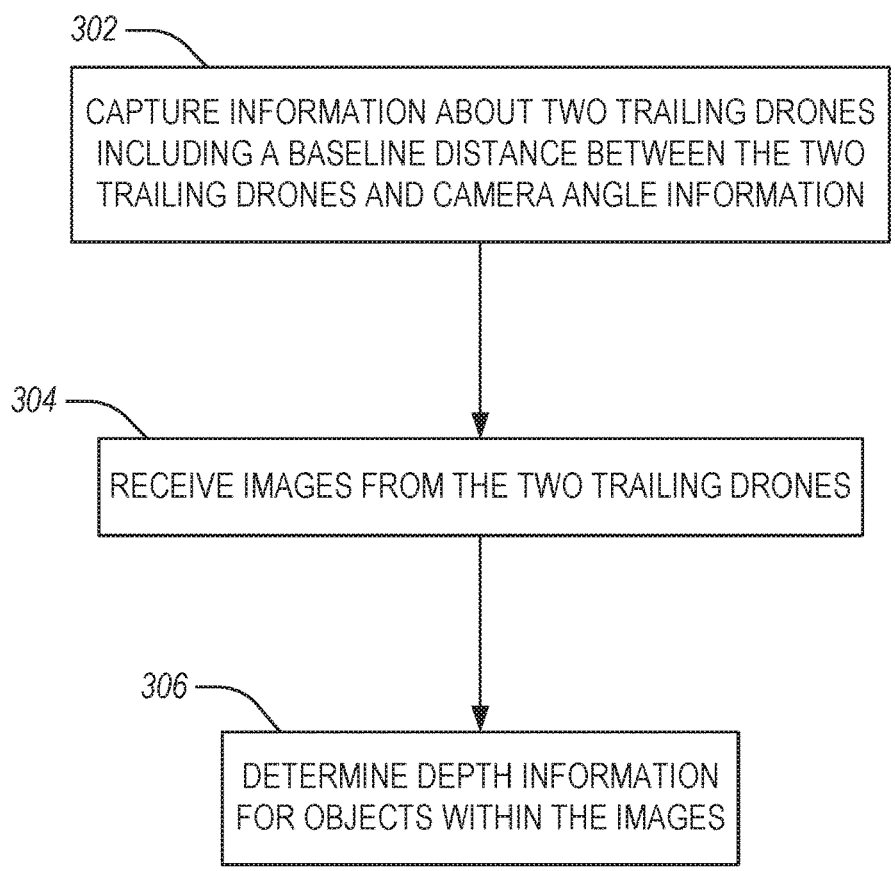
FIG. 3 illustrates a flowchart showing a technique for using a drone system to capture depth information in accordance with some embodiments.

FIG. 3 illustrates a flowchart showing a technique 300 for using a drone system to capture depth information in accordance with some embodiments. The technique 300 includes an operation 302, which may be performed by a lead drone, to capture information about two trailing drones including a baseline distance between the two trailing drones or camera angle information about the two trailing drones. The two trailing drones may trail the lead drone. Operation 302 may include capturing an image including an infrared (IR) light-emitting diode (LED) on each of the two trailing drones, and wherein determining the depth information includes using the locations of the IR LEDs of each of the two trailing drones within the image. In an example, the IR LED is time gated via a shared radio link among the lead drone and the two trailing drones to allow the IR LEDs on each of the two trailing drones to activate when the image is captured by the lead drone. In an example, although the drones referred to herein are called "lead" and "trailing" drones, the drones may be oriented such that the drones fly sideways, such that a vector of travel for the lead drone and one or more of the trailing drones are parallel, and the vector of travel is orthogonal to a camera orientation.

In an example, the captured information includes a relative distance from the lead drone to each of the two trailing drones, and wherein determining the depth information for objects within the stereoscopic image includes using the relative distance. In another example, the captured information includes a relative altitude of each of the two trailing drones to the lead drone, and wherein determining the depth information for objects within the stereoscopic image includes using the relative altitude.

The technique 300 includes an operation 304 to receive images from the two trailing drones, for example, at the lead drone or at a base station. The images may be used to create a stereoscopic image using the relative location information. The images may be received from respective single high-resolution cameras on each of the two trailing drones.

The technique 300 includes an operation 306 to determine depth information for objects within the images, such as at the lead drone or the base station. The depth information may be determined for use with the stereoscopic image based on the baseline distance between the two trailing drones and the camera angle information. The depth information may be determined using a depth error inversely proportional to a relative distance between the two trailing drones.

The technique may include an operation to create the stereoscopic image using the baseline distance between the two trailing drones for the two trailing drones. The technique may include an operation to capture information about a third trailing drone, the captured information about the third trailing drone including relative location information for the third trailing drone. This operation may include receiving an image from the third trailing drone, and creating the stereoscopic image using the image from the third trailing drone.

Figure 4:
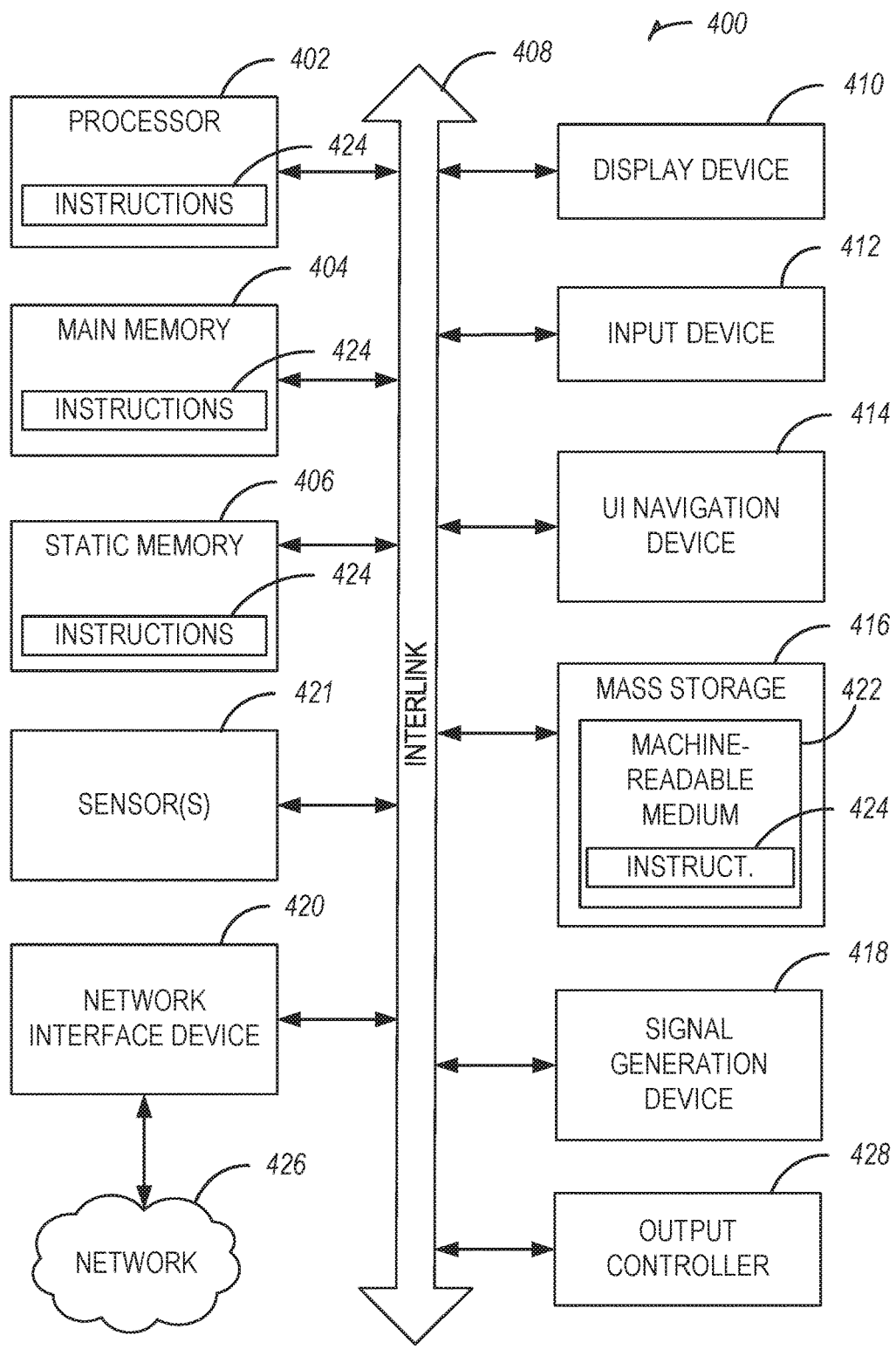
FIG. 4 illustrates generally an example of a block diagram of a machine upon which any one or more of the techniques discussed herein may perform in accordance with some embodiments.

FIG. 4 illustrates generally an example of a block diagram of a machine 400 upon which any one or more of the techniques (e.g., methodologies) discussed herein may perform in accordance with some embodiments. In alternative embodiments, the machine 400 may operate as a standalone device or may be connected (e.g., networked) to other machines. Portions or all of the machine may be incorporated into a drone, such as drone 102, 104, 106, 206, or 500 (discussed above and below). In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a drone computing device, a control system, an IMU, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, alphanumeric input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 that is non-transitory on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Figure 5:
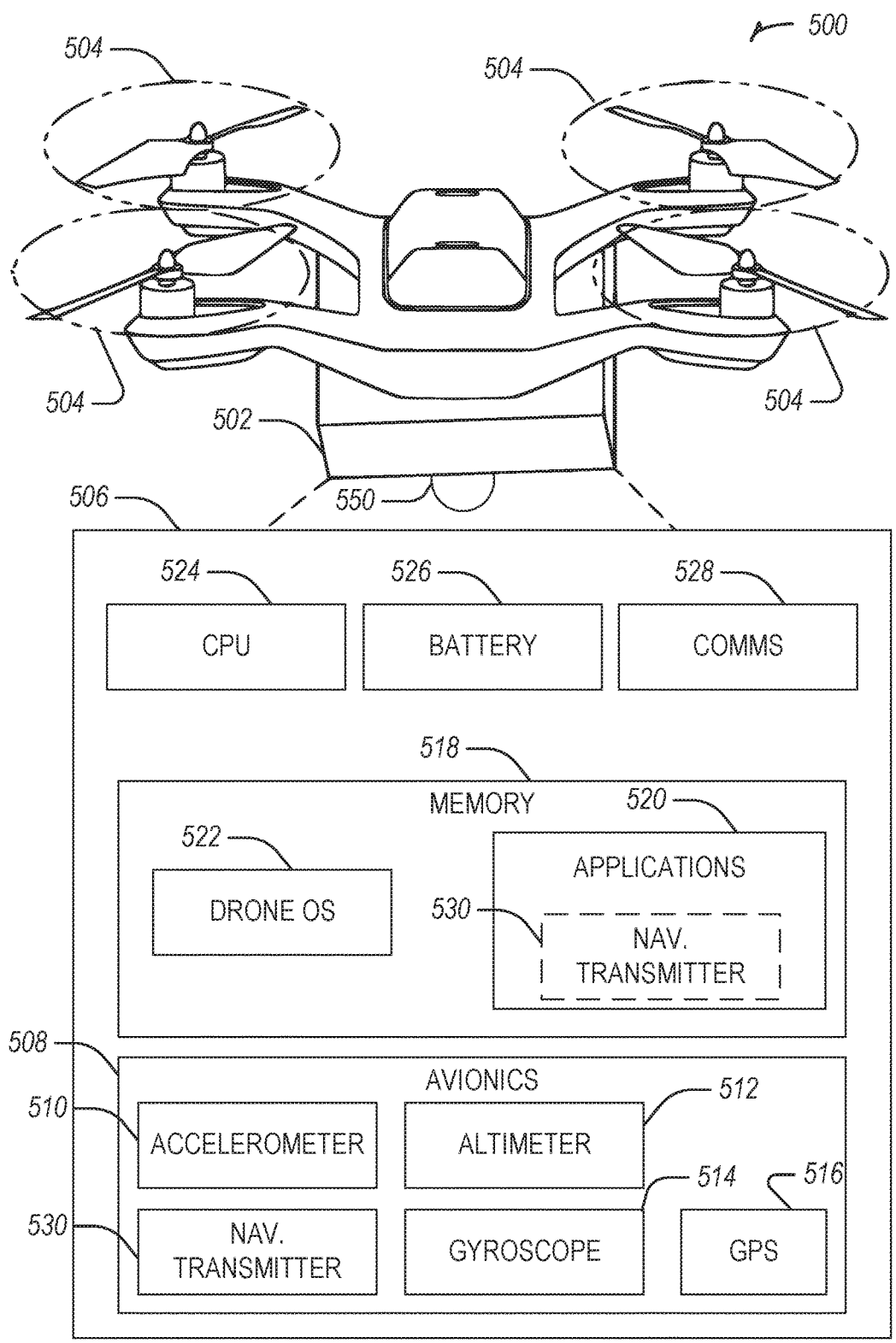
FIG. 5 shows an example schematic of a drone in accordance with some embodiments.

FIG. 5 shows an example schematic of a drone 500 in accordance with some embodiments. As shown in FIG. 5, the drone 500 may include an airframe 502, a flight mechanism 504, and computing environment 506. The airframe 502 may be made of made of polymers, metals, etc. and the other components of the drone 500 may be secured to the airframe 502.

The flight mechanism 504 may include mechanisms that may propel the drone 500 through the air. For example, the flight mechanism 504 may include propellers, rotors, turbofans, turboprops, etc. The flight mechanism 504 may operably interface with avionics 508. The avionics 508 may be part of the computing environment 506 (as shown in FIG. 5) or standalone components. For example, the avionics 508 may include accelerometers 510, an altimeter 512, gyroscopes 514, or a GPS receiver 516.

The various components of the avionics 508 may be standalone components or may be part of an autopilot system or other avionics package. For example, the altimeter 512 and GPS receiver 516 may be part of an autopilot system that includes one or more axes of control. For instance, the autopilot system may be a two-axis autopilot that may maintain a preset course and hold a preset altitude. The avionics 508 may be used to control in-flight orientation of the drone 500. For example, the avionics 508 may be used to control orientation of the drone 500 about pitch, bank, and yaw axes while in flight.

The avionics 508 may allow for autonomous flight. For example, as described herein, the drone 500 may receive a flightpath that the drone 500 may fly without further user input. In addition, the avionics 508 may include a navigation transmitter 530 that may be used to transmit commands to the flight mechanism 504. While FIG. 5 shows the navigation transmitter 530 as part of the avionics 508, the navigation transmitter 530 may be software stored in a memory 518 as shown by dashed navigation transmitter 530. In an example, the two or more trailing drones described herein may be controlled to fly in formation with respect to each other or the lead drone.

The computing environment 506 may also include the memory 518 that may store applications 520 and a drone operating system (OS) 522. The applications 520 may include lighting controls for controlling one or more LEDs 550. The applications 520 may include a communications program that may allow drone 500 to communicate with a computing device. In addition, the applications 520 may include software that functions as the navigation transmitter 530.

The memory 518 may provide a secure area for storage of components used to authenticate communications between the drone 500 and the computing device. For example, the memory 518 may store SSL certificates or other security tokens. The data stored in the memory 518 may be read-only data such that during operation the data cannot be corrupted or otherwise altered by malware, viruses, or by other users that may try and take control of the drone 500.

The computing environment 506 may include a central processing unit (CPU) 524, a battery 526, and a communications interface 528. The CPU 524 may be used to execute operations and method steps, such as those described herein with regard to FIG. 7. The memory 518 also may store data received by the drone 500 as well as programs and other software utilized by the drone 500. For example, the memory 518 may store instructions that, when executed by the CPU 524, cause the CPU 524 to perform operations such as those described herein.

The communications interface 528 may include transmitters, receivers, or transceivers that may be used to communicate with the computing device. In addition, the communications interface 528 may include a cellular interface or other wireless credential exchange circuitry. For example, the communications interface 528 may allow the drone 500 to transmit its position to the computing device and also allow the drone 500 to receive the flightpaths and other data from the computing device. While FIG. 5 shows various components of the drone 500, not all components shown in FIG. 5 are required. For example, drone 500 may not have the gyroscopes 514, the altimeter 514, etc.

VARIOUS NOTES & EXAMPLES

Each of these non-limiting examples may stand on its own, or may be combined in various permutations or combinations with one or more of the other examples.

Example 1 is a drone system for capturing depth information comprising: a lead drone to: capture information about two trailing drones, the captured information including a baseline distance between the two trailing drones and camera angle information for each of the two trailing drones; receive images from the two trailing drones, the images used to create a stereoscopic image using the relative location information; and determine depth information for objects within the stereoscopic image based on the baseline distance between the two trailing drones and the camera angle information.

In Example 2, the subject matter of Example 1 includes, wherein to capture information about the two trailing drones the lead drone is further to capture an image including an infrared (IR) light-emitting diode (LED) on each of the two trailing drones, and wherein to determine the depth information, the lead drone is to use the locations of the IR LEDs of each of the two trailing drones within the image.

In Example 3, the subject matter of Example 2 includes, wherein the IR LED is time gated via a shared radio link among the lead drone and the two trailing drones to allow the IR LEDs on each of the two trailing drones to initiate capturing the image by the lead drone.

In Example 4, the subject matter of Examples 1-3 includes, wherein the captured information includes a relative distance from the lead drone to each of the two trailing drones, and wherein to determine depth information for objects within the stereoscopic image, the lead drone is to use the relative distance.

In Example 5, the subject matter of Examples 1-4 includes, wherein the captured information includes a relative altitude of each of the two trailing drones to the lead drone, and wherein to determine depth information for objects within the stereoscopic image, the lead drone is to use the relative altitude.

In Example 6, the subject matter of Examples 1-5 includes, wherein the images are received from respective single high-resolution cameras on each of the two trailing drones.

In Example 7, the subject matter of Examples 1-6 includes, wherein the lead drone is further to create the stereoscopic image using the baseline distance between the two trailing drones for the two trailing drones.

In Example 8, the subject matter of Examples 1-7 includes, wherein the depth information is determined using a depth error inversely proportional to a relative distance between the two trailing drones.

In Example 9, the subject matter of Examples 1-8 includes, wherein the lead drone is further to capture information about a third trailing drone, the captured information about the third trailing drone including relative location information for the third trailing drone, receive an image from the third trailing drone, and create the stereoscopic image using the image from the third trailing drone.

Example 10 is a drone based mapping system comprising: a lead drone to: capture information about two trailing drones, the captured information including a baseline distance between the two trailing drones and camera angle information for each of the two trailing drones; receive images from the two trailing drones; create a stereoscopic image of an area based on the images, the baseline distance between the two trailing drones, and the camera angle information; and create a depth map including depth information of the area of the images based on the stereoscopic image.

In Example 11, the subject matter of Example 10 includes, wherein to capture information about the two trailing drones the lead drone is further to capture an image including an infrared (IR) light-emitting diode (LED) on each of the two trailing drones, and wherein to determine the depth information, the lead drone is to use the locations of the IR LEDs of each of the two trailing drones within the image.

In Example 12, the subject matter of Example 11 includes, wherein the IR LED is time gated via a shared radio link among the lead drone and the two trailing drones to allow the IR LEDs on each of the two trailing drones to initiate capturing the image by the lead drone.

In Example 13, the subject matter of Examples 10-12 includes, wherein the captured information includes a relative distance from the lead drone to each of the two trailing drones, and wherein to create the stereoscopic image of the area, the lead drone is to use the relative distance.

In Example 14, the subject matter of Examples 10-13 includes, wherein the captured information includes a relative altitude of each of the two trailing drones to the lead drone, and wherein to create the stereoscopic image of the area, the lead drone is to use the relative altitude.

In Example 15, the subject matter of Examples 10-14 includes, wherein the images are received from respective single high-resolution cameras on each of the two trailing drones.

In Example 16, the subject matter of Examples 10-15 includes, wherein the depth information is determined using a depth error inversely proportional to a relative distance between the two trailing drones.

In Example 17, the subject matter of Examples 10-16 includes, wherein the lead drone is further to capture information about a third trailing drone, the captured information about the third trailing drone including relative location information for the third trailing drone, receive an image from the third trailing drone, and create the stereoscopic image using the image from the third trailing drone.

Example 18 is a method for capturing depth information comprising: capturing, at a lead drone, information about two trailing drones, the captured information including a baseline distance between the two trailing drones and camera angle information for each of the two trailing drones; receiving, at the lead drone, images from the two trailing drones, the images used to create a stereoscopic image using the relative location information, and determining depth information for objects within the stereoscopic image based on the baseline distance between the two trailing drones and the camera angle information.

In Example 19, the subject matter of Example 18 includes, wherein capturing information about the two trailing drones includes capturing an image including an infrared (IR) light-emitting diode (LED) on each of the two trailing drones, and wherein determining the depth information includes using the locations of the IR LEDs of each of the two trailing drones within the image.

In Example 20, the subject matter of Example 19 includes, wherein the IR LED is time gated via a shared radio link among the lead drone and the two trailing drones to allow the IR LEDs on each of the two trailing drones to initiate capturing the image by the lead drone.

In Example 21, the subject matter of Examples 18-20 includes, wherein the captured information includes a relative distance from the lead drone to each of the two trailing drones, and wherein determining the depth information for objects within the stereoscopic image includes using the relative distance.

In Example 22, the subject matter of Examples 18-21 includes, wherein the captured information includes a relative altitude of each of the two trailing drones to the lead drone, and wherein determining the depth information for objects within the stereoscopic image includes using the relative altitude.

In Example 23, the subject matter of Examples 18-22 includes, wherein the images are received from respective single high-resolution cameras on each of the two trailing drones.

In Example 24, the subject matter of Examples 18-23 includes, creating the stereoscopic image using the baseline distance between the two trailing drones for the two trailing drones.

In Example 25, the subject matter of Examples 18-24 includes, wherein the depth information is determined using a depth error inversely proportional to a relative distance between the two trailing drones.

In Example 26, the subject matter of Examples 18-25 includes, capturing information about a third trailing drone, the captured information about the third trailing drone including relative location information for the third trailing drone; receiving an image from the third trailing drone; and creating the stereoscopic image using the image from the third trailing drone.

Example 27 is at least one machine-readable medium including instructions for operation of a computing system, which when executed by a machine, cause the machine to perform operations of any of the methods of Examples 18-26.

Example 28 is an apparatus comprising means for performing any of the methods of Examples 18-26.

Example 29 is at least one machine-readable medium including instructions for capturing depth information, which when executed by a processor of a lead drone, cause the processor to: capture, at a lead drone, information about two trailing drones, the captured information including a baseline distance between the two trailing drones and camera angle information for each of the two trailing drones; receive, at the lead drone, images from the two trailing drones, the images used to create a stereoscopic image using the relative location information; and determine depth information for objects within the stereoscopic image based on the baseline distance between the two trailing drones and the camera angle information.

In Example 30, the subject matter of Example 29 includes, wherein to capture information about the two trailing drones, the instructions further cause the processor to capture an image including an infrared (IR) light-emitting diode (LED) on each of the two trailing drones, and wherein to determine the depth information, the instructions further cause the processor to use the locations of the IR LEDs of each of the two trailing drones within the image.

In Example 31, the subject matter of Example 30 includes, wherein the IR LED is time gated via a shared radio link among the lead drone and the two trailing drones to allow the IR LEDs on each of the two trailing drones to initiate capturing the image by the lead drone.

In Example 32, the subject matter of Examples 29-31 includes, wherein the captured information includes a relative distance from the lead drone to each of the two trailing drones, and wherein to determine the depth information for objects within the stereoscopic image, the instructions further cause the processor to use the relative distance.

In Example 33, the subject matter of Examples 29-32 includes, wherein the captured information includes a relative altitude of each of the two trailing drones to the lead drone, and wherein to determine the depth information for objects within the stereoscopic image, the instructions further cause the processor to use the relative altitude.

In Example 34, the subject matter of Examples 29-33 includes, wherein the images are received from respective single high-resolution cameras on each of the two trailing drones.

In Example 35, the subject matter of Examples 29-34 includes, wherein the instructions further cause the processor to create the stereoscopic image using the baseline distance between the two trailing drones for the two trailing drones.

In Example 36, the subject matter of Examples 29-35 includes, wherein the depth information is determined using a depth error inversely proportional to a relative distance between the two trailing drones.

In Example 37, the subject matter of Examples 29-36 includes, wherein the instructions further cause the processor to: capture information about a third trailing drone, the captured information about the third trailing drone including relative location information for the third trailing drone; receive an image from the third trailing drone; and create the stereoscopic image using the image from the third trailing drone.

Example 38 is an apparatus for capturing depth information comprising: means for capturing, at a lead drone, information about two trailing drones, the captured information including a baseline distance between the two trailing drones and camera angle information for each of the two trailing drones; means for receiving, at the lead drone, images from the two trailing drones, the images used to create a stereoscopic image using the relative location information; and means for determining depth information for objects within the stereoscopic image based on the baseline distance between the two trailing drones and the camera angle information.

In Example 39, the subject matter of Example 38 includes, wherein the means for capturing information about the two trailing drones include means for capturing an image including an infrared (IR) light-emitting diode (LED) on each of the two trailing drones, and wherein the means for determining the depth information include means for using the locations of the IR LEDs of each of the two trailing drones within the image.

In Example 40, the subject matter of Example 39 includes, wherein the IR LED is time gated via a shared radio link among the lead drone and the two trailing drones to allow the IR LEDs on each of the two trailing drones to initiate capturing the image by the lead drone.

In Example 41, the subject matter of Examples 38-40 includes, wherein the captured information includes a relative distance from the lead drone to each of the two trailing drones, and wherein the means for determining the depth information for objects within the stereoscopic image include means for using the relative distance.

In Example 42, the subject matter of Examples 38-41 includes, wherein the captured information includes a relative altitude of each of the two trailing drones to the lead drone, and wherein the means for determining the depth information for objects within the stereoscopic image include means for using the relative altitude.

In Example 43, the subject matter of Examples 38-42 includes, wherein the images are received from respective single high-resolution cameras on each of the two trailing drones.

In Example 44, the subject matter of Examples 38-43 includes, means for creating the stereoscopic image using the baseline distance between the two trailing drones for the two trailing drones.

In Example 45, the subject matter of Examples 38-44 includes, wherein the depth information is determined using a depth error inversely proportional to a relative distance between the two trailing drones.

In Example 46, the subject matter of Examples 38-45 includes, means for capturing information about a third trailing drone, the captured information about the third trailing drone including relative location information for the third trailing drone; means for receiving an image from the third trailing drone; and means for creating the stereoscopic image using the image from the third trailing drone.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A drone system for capturing depth information comprising:
    a lead drone to:
        capture information about two trailing drones, the captured information including a baseline distance between the two trailing drones and camera angle information for each of the two trailing drones;
        receive images from the two trailing drones, the images used to create a stereoscopic image using the baseline distance between the two trailing drones and the camera angle information for each of the two trailing drones; and
        determine depth information for objects within the stereoscopic image based on the baseline distance between the two trailing drones and the camera angle information.

2. The drone system of claim 1, wherein to capture information about the two trailing drones the lead drone is further to capture an image including an infrared (IR) light-emitting diode (LED) on each of the two trailing drones, and wherein to determine the depth information, the lead drone is to use the locations of the IR LEDs of each of the two trailing drones within the image.

3. The drone system of claim 2, wherein the IR LED is time gated via a shared radio link among the lead drone and the two trailing drones to allow the IR LEDs on each of the two trailing drones to initiate capturing the image by the lead drone.

4. The drone system of claim 1, wherein the captured information includes a relative distance from the lead drone to each of the two trailing drones, and wherein to determine depth information for objects within the stereoscopic image, the lead drone is to use the relative distance.

5. The drone system of claim 1, wherein the captured information includes a relative altitude of each of the two trailing drones to the lead drone, and wherein to determine depth information for objects within the stereoscopic image, the lead drone is to use the relative altitude.

6. The drone system of claim 1, wherein the images are received from respective single high-resolution cameras on each of the two trailing drones.

7. The drone system of claim 1, wherein the depth information is determined using a depth error inversely proportional to a relative distance between the two trailing drones.

8. The drone system of claim 1, wherein the lead drone is further to capture information about a third trailing drone, the captured information about the third trailing drone including relative location information for the third trailing drone, receive an image from the third trailing drone, and create the stereoscopic image using the image from the third trailing drone.

9. A drone based mapping system comprising:
a lead drone to:
capture information about two trailing drones, the captured information including a baseline distance between the two trailing drones and camera angle information for each of the two trailing drones;
receive images from the two trailing drones;
create a stereoscopic image of an area based on the images, the baseline distance between the two trailing drones, and the camera angle information; and
create a depth map including depth information of the area of the images based on the stereoscopic image.

10. The drone based mapping system of claim 9, wherein to capture information about the two trailing drones the lead drone is further to capture an image including an infrared (IR) light-emitting diode (LED) on each of the two trailing drones, and wherein to determine the depth information, the lead drone is to use the locations of the IR LEDs of each of the two trailing drones within the image.

11. The drone based mapping system of claim 10, wherein the IR LED is time gated via a shared radio link among the lead drone and the two trailing drones to allow the IR LEDs on each of the two trailing drones to initiate capturing the image by the lead drone.

12. The drone based mapping system of claim 9, wherein the captured information includes a relative distance from the lead drone to each of the two trailing drones, and wherein to create the stereoscopic image of the area, the lead drone is to use the relative distance.

13. The drone based mapping system of claim 9, wherein the images are received from respective single high-resolution cameras on each of the two trailing drones.

14. The drone based mapping system of claim 9, wherein the depth information is determined using a depth error inversely proportional to a relative distance between the two trailing drones.

15. A method for capturing depth information comprising:
capturing, at a lead drone, information about two trailing drones, the captured information including a baseline distance between the two trailing drones and camera angle information for each of the two trailing drones;
receiving, at the lead drone, images from the two trailing drones, the images used to create a stereoscopic image using the baseline distance between the two trailing drones and the camera angle information for each of the two trailing drones; and
determining depth information for objects within the stereoscopic image based on the baseline distance between the two trailing drones and the camera angle information.

16. The method of claim 15, wherein capturing information about the two trailing drones includes capturing an image including an infrared (IR) light-emitting diode (LED) on each of the two trailing drones, and wherein determining the depth information includes using the locations of the IR LEDs of each of the two trailing drones within the image.

17. The method of claim 15, wherein the captured information includes a relative altitude of each of the two trailing drones to the lead drone, and wherein determining the depth information for objects within the stereoscopic image includes using the relative altitude.

18. The method of claim 15, wherein the images are received from respective single high-resolution cameras on each of the two trailing drones.

19. The method of claim 15, wherein the depth information is determined using a depth error inversely proportional to a relative distance between the two trailing drones.

20. The method of claim 15, further comprising:
capturing information about a third trailing drone, the captured information about the third trailing drone including relative location information for the third trailing drone;
receiving an image from the third trailing drone; and
creating the stereoscopic image using the image from the third trailing drone.

21. At least one non-transitory machine-readable medium including instructions for capturing depth information, which when executed by a processor of a lead drone, cause the processor to:
capture, at a lead drone, information about two trailing drones, the captured information including a baseline distance between the two trailing drones and camera angle information for each of the two trailing drones;
receive, at the lead drone, images from the two trailing drones, the images used to create a stereoscopic image using the baseline distance between the two trailing drones and the camera angle information for each of the two trailing drones; and
determine depth information for objects within the stereoscopic image based on the baseline distance between the two trailing drones and the camera angle information.

22. The at least one machine-readable medium of claim 21, wherein the depth information is determined using a depth error inversely proportional to a relative distance between the two trailing drones.

23. The at least one machine-readable medium of claim 21, wherein the captured information includes a relative distance from the lead drone to each of the two trailing drones, and wherein to determine the depth information for objects within the stereoscopic image, the instructions further cause the processor to use the relative distance.

24. The at least one machine-readable medium of claim 21, wherein the captured information includes a relative altitude of each of the two trailing drones to the lead drone, and wherein to determine the depth information for objects within the stereoscopic image, the instructions further cause the processor to use the relative altitude.

25. The at least one machine-readable medium of claim 21, wherein the images are received from respective single high-resolution cameras on each of the two trailing drones.

* * * * *